US011886874B2

(12) United States Patent
Kishimoto et al.

(10) Patent No.: US 11,886,874 B2
(45) Date of Patent: Jan. 30, 2024

(54) ARITHMETIC OPERATION DEVICE AND ARITHMETIC OPERATION METHOD

(71) Applicant: HITACHI ASTEMO, LTD., Hitachinaka (JP)

(72) Inventors: Tadashi Kishimoto, Tokyo (JP); Goichi Ono, Tokyo (JP); Akira Kitayama, Tokyo (JP); Daichi Murata, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 253 days.

(21) Appl. No.: 17/610,251

(22) PCT Filed: Apr. 8, 2020

(86) PCT No.: PCT/JP2020/015878
§ 371 (c)(1),
(2) Date: Nov. 10, 2021

(87) PCT Pub. No.: WO2020/230488
PCT Pub. Date: Nov. 19, 2020

(65) Prior Publication Data
US 2022/0236985 A1    Jul. 28, 2022

(30) Foreign Application Priority Data
May 16, 2019    (JP) ................. 2019-092626

(51) Int. Cl.
*G06F 9/30*    (2018.01)
*G06F 7/499*    (2006.01)
*G06N 3/063*    (2023.01)

(52) U.S. Cl.
CPC .......... *G06F 9/3001* (2013.01); *G06F 7/4991* (2013.01); *G06F 7/49947* (2013.01); *G06N 3/063* (2013.01)

(58) Field of Classification Search
None
See application file for complete search history.

(56) References Cited

U.S. PATENT DOCUMENTS

2008/0056616 A1    3/2008    Hasegawa
2009/0049417 A1    2/2009    Kinoshita et al.
(Continued)

FOREIGN PATENT DOCUMENTS

| JP | 2008-059287 A | 3/2008 |
| JP | 2009-048367 A | 3/2009 |
| WO | WO-2019/029785 A1 | 2/2019 |

OTHER PUBLICATIONS

Kishimoto, et al., "The Overflow Suppression Technique of FPGA Implementation for Convolutional Neural Network", Proceedings of the 2019 IEICE Engineering Sciences Society/NOLTA Society Conference, Aug. 27, 2019, p. 8, ISSN 2189-700X.
(Continued)

*Primary Examiner* — Michael Sun
(74) *Attorney, Agent, or Firm* — Foley & Lardner LLP

(57) ABSTRACT

An arithmetic operation device causes a convolution arithmetic unit to perform a convolution arithmetic operation between a filter and target data corresponding to a size of the filter in each of a plurality of convolution layers constituting a neural network. The arithmetic operation device includes: a bit reduction unit that reduces a bit string corresponding to a first bit number from a least significant bit of the target data and reduces a bit string corresponding to a second bit number from a least significant bit of a weight that is an element of the filter for each convolution layer; and a bit addition unit that adds a bit string corresponding to a third bit number obtained by adding the first bit number and the second bit number to a least significant bit of a convolution arithmetic operation result output from the convolution (Continued)

arithmetic unit by inputting the target data and the weight after being reduced by the bit reduction unit to the convolution arithmetic unit.

10 Claims, 11 Drawing Sheets

(56) References Cited

U.S. PATENT DOCUMENTS

2017/0323197 A1* 11/2017 Gibson .................. G06N 3/048
2018/0232621 A1    8/2018 Du et al.
2020/0257930 A1*  8/2020 Nahr ...................... G06V 10/82

OTHER PUBLICATIONS

International Search Report with English translation and Written Opinion issued in corresponding application No. PCT/JP2020/015878 dated Jun. 23, 2020.

* cited by examiner

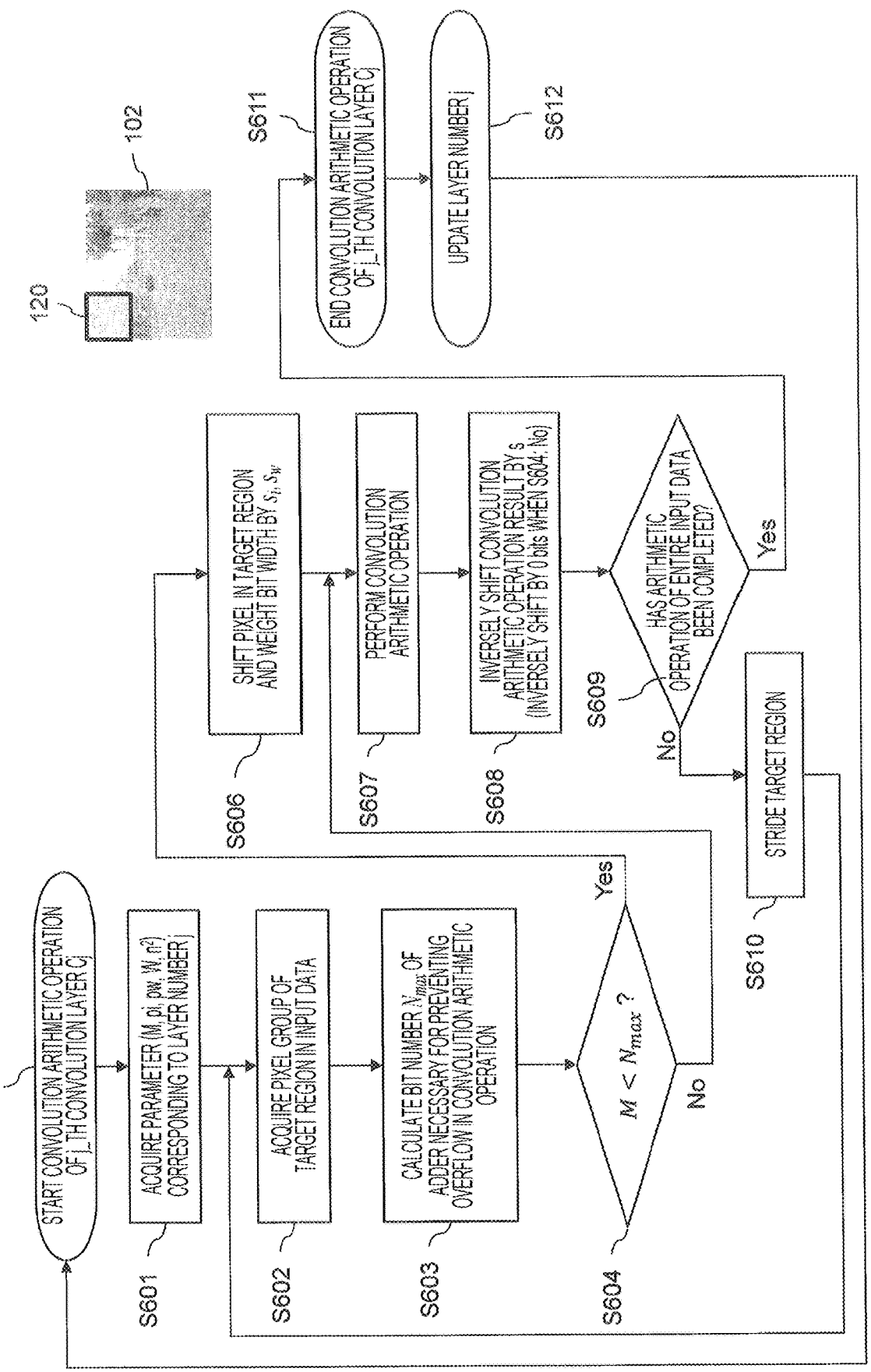

ARITHMETIC OPERATION DEVICE AND ARITHMETIC OPERATION METHOD

INCORPORATION BY REFERENCE

The present application claims priority to Japanese Patent Application No. 2019-92626 filed on May 16, 2019, the contents of which are incorporated herein by reference.

TECHNICAL FIELD

The present invention relates to an arithmetic operation device and an arithmetic operation method that execute a convolution arithmetic operation.

BACKGROUND ART

Application of object recognition, behavior prediction, and the like using a deep neural network (DNN) to automatic driving is in progress. When the DNN is mounted on an in-vehicle electronic control unit (ECU), it is necessary to reduce a circuit mounting scale. The DNN is mounted for each layer due to the restriction of the circuit mounting scale, and the convolution arithmetic operation is executed in the same circuit by changing the input parameter for each layer. An overflow may occur in the convolution arithmetic operation of the DNN, and it is necessary to increase a bit number of a convolution arithmetic unit and the circuit mounting scale as a countermeasure. Since the determination result of the overflow of the DNN is different for each layer, the optimum bit number of the convolution arithmetic unit is different for each layer. In circuit mounting, it is necessary to select a circuit mounting scale according to the layer with the most severe conditions.

The circuit design method of PTL 1 creates a program while adding a directive to a target operation for which overflow determination is performed regarding desired digital signal processing, performs operation synthesis on the basis of the program, and adds an overflow detection circuit to the target operation to which the directive is added to generate an RTL circuit.

CITATION LIST

Patent Literature

PTL 1: JP 2009-48367 A

SUMMARY OF INVENTION

Technical Problem

In the circuit design method of PTL 1 described above, an overflow determination circuit is provided at the time of circuit design, and an overflow is determined after an actual arithmetic operation is performed. Therefore, it is not known whether the overflow occurs until the arithmetic operation is performed, and it is not possible to take measures when the overflow occurs after the circuit is mounted. In addition, in the circuit design method of PTL 1, an overflow is determined, and the bit number of an arithmetic unit is increased on the basis of the determination result. Therefore, the circuit scale of the convolution arithmetic unit increases.

An object of the present invention is to prevent occurrence of overflow in a convolution arithmetic operation device.

Solution to Problem

An arithmetic operation device according to one aspect of the invention disclosed in the present application is an arithmetic operation device that causes a convolution arithmetic unit to perform a convolution arithmetic operation between a filter and target data corresponding to a size of the filter in each of a plurality of convolution layers constituting a neural network, the arithmetic operation device comprising: a bit reduction unit that reduces a bit string corresponding to a first bit number from a least significant bit of the target data and reduces a bit string corresponding to a second bit number from a least significant bit of a weight that is an element of the filter for each convolution layer; and a bit addition unit that adds a bit string corresponding to a third bit number obtained by adding the first bit number and the second bit number to a least significant bit of a convolution arithmetic operation result output from the convolution arithmetic unit by inputting the target data and the weight after being reduced by the bit reduction unit to the convolution arithmetic unit.

Advantageous Effects of Invention

According to a representative embodiment of the present invention, occurrence of overflow in a convolution arithmetic unit can be suppressed in advance. Objects, configurations, and effects besides the above description will be apparent through the explanation on the following embodiments.

BRIEF DESCRIPTION OF DRAWINGS

FIG. 11 is a flowchart illustrating an example of an arithmetic processing procedure of the arithmetic operation device according to the fourth embodiment.

DESCRIPTION OF EMBODIMENTS

First Embodiment

<CNN>

Figure 1:
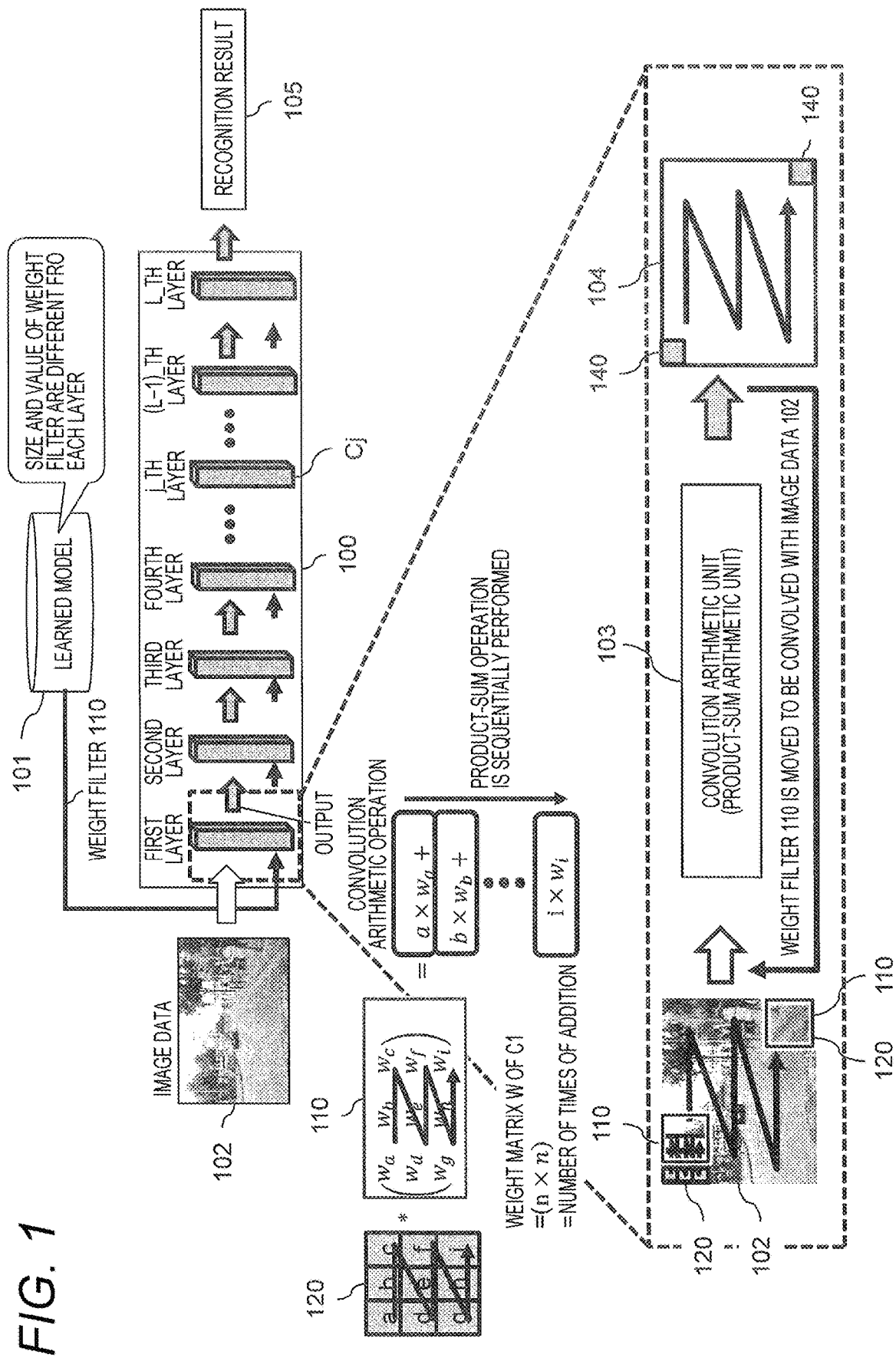
FIG. 1 is an explanatory diagram illustrating a CNN for performing external environment recognition.

FIG. 1 is an explanatory diagram illustrating a convolutional neural network (CNN) for performing external environment recognition. The CNN 100 is a convolutional neural network including L (L is an integer of 2 or more) convolution layers. In FIG. 1, a pooling layer, a fully connected layer, and an output layer other than the convolution layer are omitted. For example, when image data 102 is input, the CNN 100 sequentially performs a convolution arithmetic operation by the L convolution layers C1 to CL, and outputs a recognition result 105 of an object displayed in the image data 102. The convolution layer of a j_th layer having an arbitrary layer number j is referred to as a j_th convolution layer Cj (1≤j≤L) or a convolution layer Cj.

Here, the convolution arithmetic operation will be described by taking a first convolution layer C1 (j=1) as an example. The CNN 100 acquires a weight filter 110 corresponding to the first convolution layer C1 from a learned model 101. The learned model 101 has a different weight filter 110 for each convolution layer Cj. The weight filter 110 is expressed by, for example, a weight matrix W of n×n (n is an integer of 1 or more). n×n is the number of times of addition in the product-sum operation in the convolution arithmetic operation. In FIG. 1, as an example, n=3, and weights wa to wi which are nine elements are included.

In the CNN 100, the convolution arithmetic unit 103 performs a convolution arithmetic operation using pixels a to i of a n×n target region 120 that is the same as the weight matrix W in the image data 102 and the weight matrix W, and outputs a convolution arithmetic operation result 140 of the target region 120. The CNN 100 outputs the convolution arithmetic operation result 140 for each target region 120 while raster-scanning the weight matrix W in the image data 102 by the convolution arithmetic unit 103, thereby outputting a convolution arithmetic operation result 104 to a second convolution layer C2 in the subsequent stage. Since the calculation amount of the CNN 100 is enormous, overflow may occur in the adder in the CNN 100 when the product-sum operation is performed in each target region 120 in the CNN 100.

<Convolution Arithmetic Operation Example>

Figure 2:
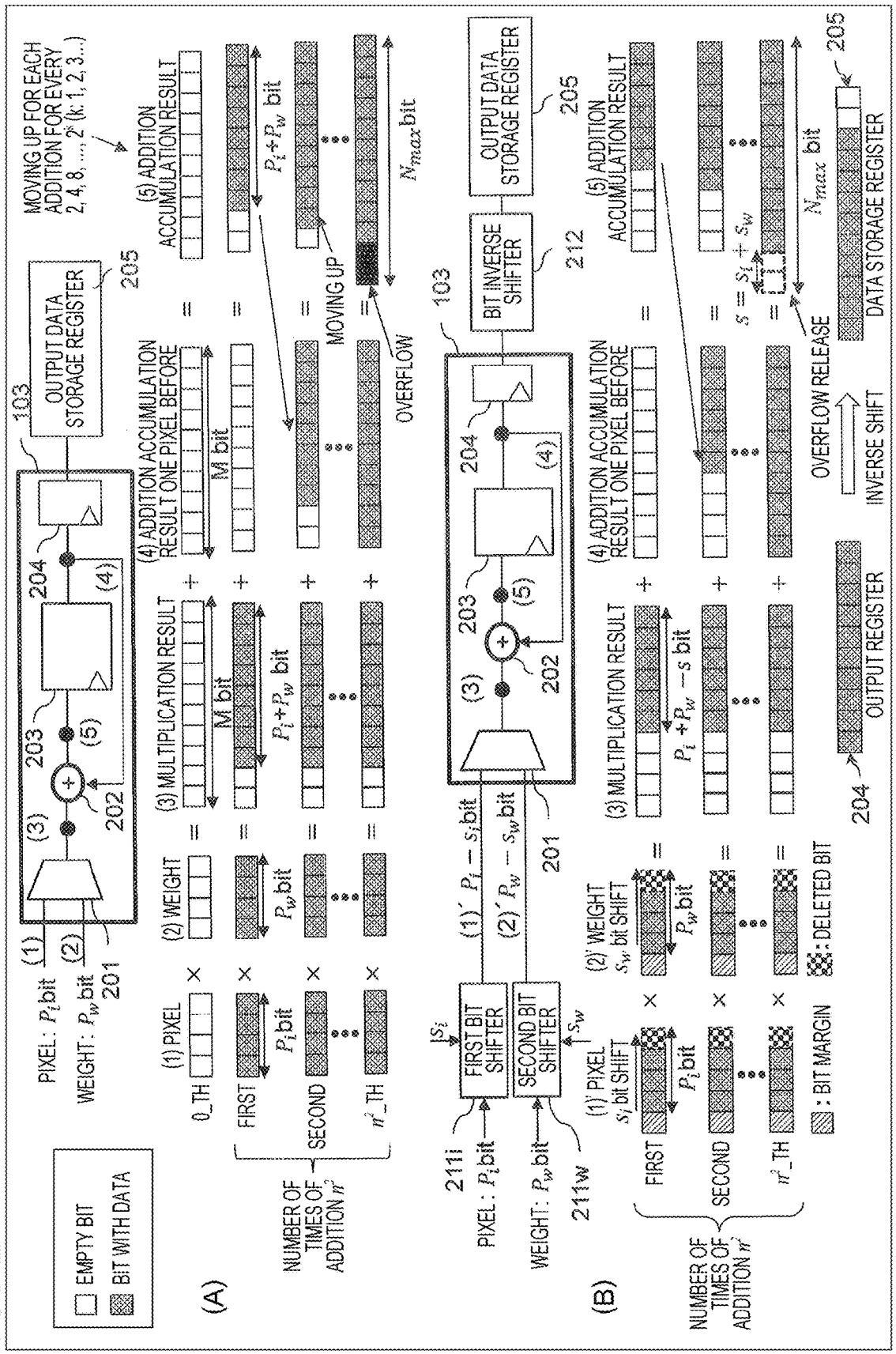
FIG. 2 is an explanatory diagram illustrating a convolution arithmetic operation example illustrated in FIG. 1.
Figure 3:
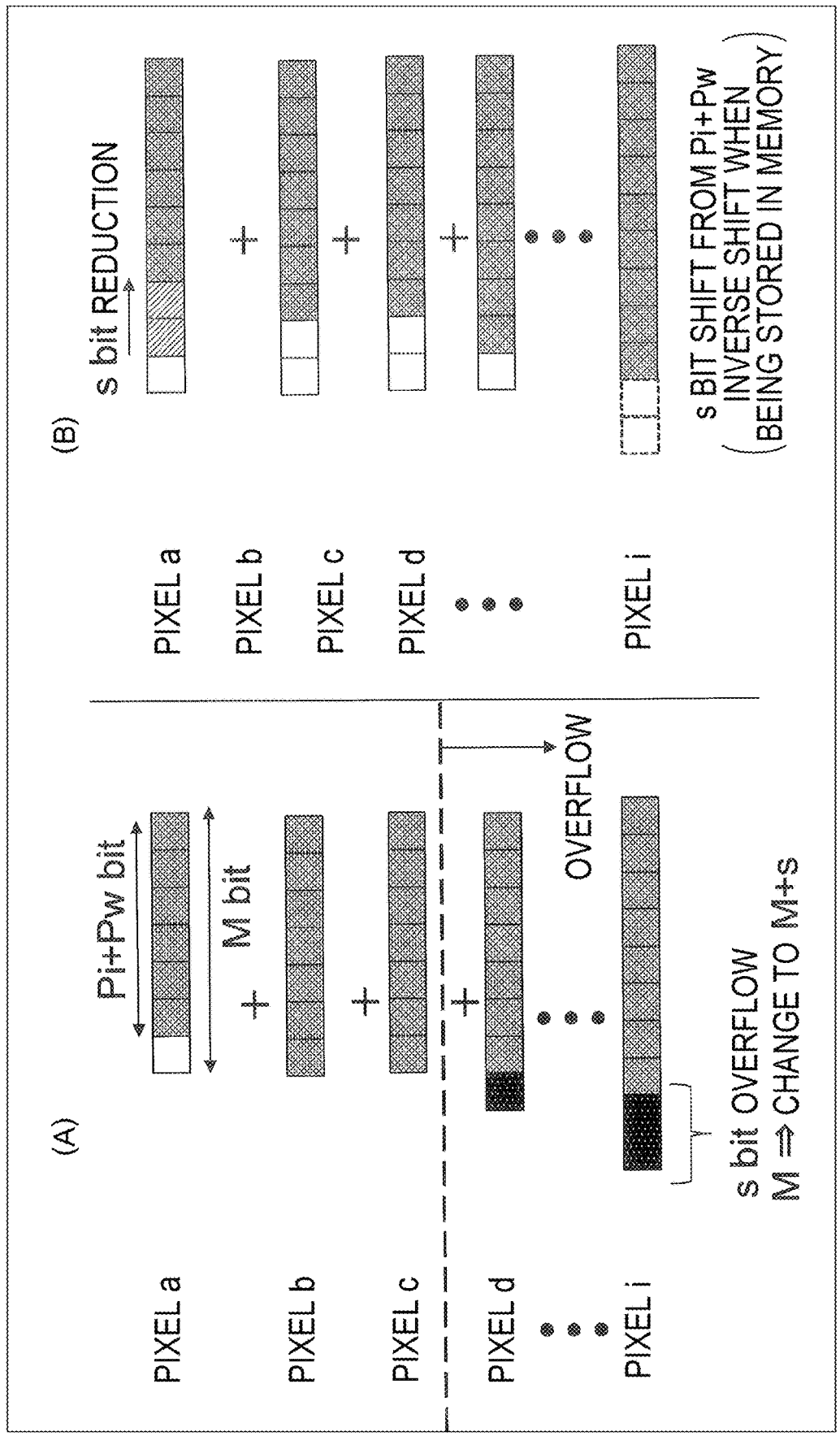
FIG. 3 is a partially enlarged view of FIG. 2.

FIG. 2 is an explanatory diagram illustrating a convolution arithmetic operation example illustrated in FIG. 1. FIG. 3 is a partially enlarged view of FIG. 2. In FIGS. 2 and 3, (A) illustrates a convolution arithmetic operation example in a case where bit shift and bit inverse shift are not performed on each bit string indicating a pixel and a weight, and (B) illustrates a convolution arithmetic operation example in a case where bit shift and bit inverse shift are performed on each bit string indicating a pixel and a weight.

A bit number pi, which is a bit width for expressing the values of the pixels a to i, is not limited to the same bit number, but in the present example, the bit number of any of the pixels a to i is also referred to as pi for convenience. Similarly, a bit number pw, which is a bit width for expressing the values of the weights wa to wi, is not limited to the same bit number, but in the present example, the bit number of any of the weights wa to wi is also referred to as pw for convenience.

In FIG. 2(A), the convolution arithmetic unit 103 sequentially operates multiplication and addition of the convolution arithmetic operation by a product-sum operator in the j_th convolution layer Cj. The convolution arithmetic unit 103 includes a multiplier 201, an adder 202, a storage register 203, and an output register 204. The multiplier 201 is a 2-input 1-output circuit. The multiplier 201 inputs (1) a pixel (for example, the pixel b) having the bit number pi from the target region 120 and (2) a weight (for example, the weight wb) having the bit number pw which is an element of the weight matrix W corresponding to the pixel, and outputs (3) a multiplication result (for example, b×wb) of the bit number (pi+pw).

The adder 202 adds (3) the multiplication result (for example, b×wb) and (4) the cumulative addition result (for example, a×wa) one pixel before, and outputs (5) the latest cumulative addition result (for example, a×wa+b×wb) to the storage register 203. The maximum bit number of the adder 202 is set to M bits. M is an integer of 1 or more. The bit number of the cumulative addition result is moved up every $2^k$_th addition (k=1, 2, 3, . . . ).

The storage register 203 stores (5) the latest cumulative addition result. The output register 204 acquires the latest cumulative addition result at the end of addition of the number of times of addition n×n, that is, at the end of the convolution arithmetic operation in the target region 120 from the storage register 203, and outputs the result to an output data storage register 205.

Before the convolution arithmetic operation, that is, in the 0_th addition, the bit number pi in (1), the bit number pw in (2), the bit number (pi+pw) in (3), the bit number of the cumulative addition result one pixel before in (4), and the bit number of the addition accumulation result in (5) are all 0 bits.

In the first operation of the number of times of addition n×n, the convolution arithmetic unit 103 outputs a (3) multiplication result a×wa (the bit number (pi+pw)) of (1) the pixel a having the bit number pi and (2) the weight wa having the bit number pw. (4) Since it is the first pixel a in the target region 120, there is no addition accumulation result one pixel before. Therefore, the latest addition accumulation result of (5) is a multiplication result a×wa of the bit number (pi+pw).

In the second operation of the number of times of addition n×n, the convolution arithmetic unit 103 outputs a (3) multiplication result b×wb (the bit number (pi+pw)) of (1) the pixel b having the bit number pi and (2) the weight wb having the bit number pw. (4) The addition accumulation result one pixel before is a multiplication result a×wa of the bit number (pi+pw). Therefore, the latest addition accumulation result (5) is a multiplication result (a×wa+b×wb) of the bit number (pi+pw+1). As illustrated in (A) of FIG. 3, the convolution arithmetic unit 103 executes such processing up to the pixel i.

In this manner, the convolution arithmetic unit 103 repeats the convolution arithmetic operation up to the number of times of addition n×n. In this case, if the bit number Nmax of (5) the addition accumulation result at the end of the (n×n)_th addition becomes larger than the bit number M of the adder 202, overflow occurs and the calculation accuracy decreases. When the bit number corresponding to overflow is s (s is an integer satisfying s>0), the bit number M of the adder 202 of the convolution arithmetic unit 103 needs to be changed from M bits to M+s bits in order to prevent the occurrence of the overflow.

More specifically, the overflow occurrence condition (the number of times of addition n×n, number of input bits of pixels and weights) is different for each convolution layer Cj. Therefore, it is necessary to adjust the bit number M of the adder 202 according to the convolution layer Cj having the most severe overflow condition among all the convolution layers C1 to CL. This increases the circuit scale. Specifically, for example, in a case where the bit number for overflow of each convolution layer Cj is sj (1≤j≤L), the maximum bit number among the bit numbers s1 to sL for overflow is s. In this case, in order to prevent the occurrence of overflow, the bit number M of the adder 202 of the convolution arithmetic unit 103 needs to be changed from M bits to M+s bits.

In (B) of FIG. 2, bit shifters 211$i$ and 211$w$ are provided at the preceding stage of the convolution arithmetic unit 103, and a bit inverse shifter 212 is provided at the subsequent stage of the convolution arithmetic unit 103. The bit shifter 211$i$ shifts the pixel bit number pi by the number of si bits. The bit shifter 211$w$ shifts the weight bit number pw by the number of sw bits. Note that the relationship between the bit numbers si and sw may satisfy the following Expression (1).

$$s = si + sw > 0 \quad (1)$$

Figure 4:
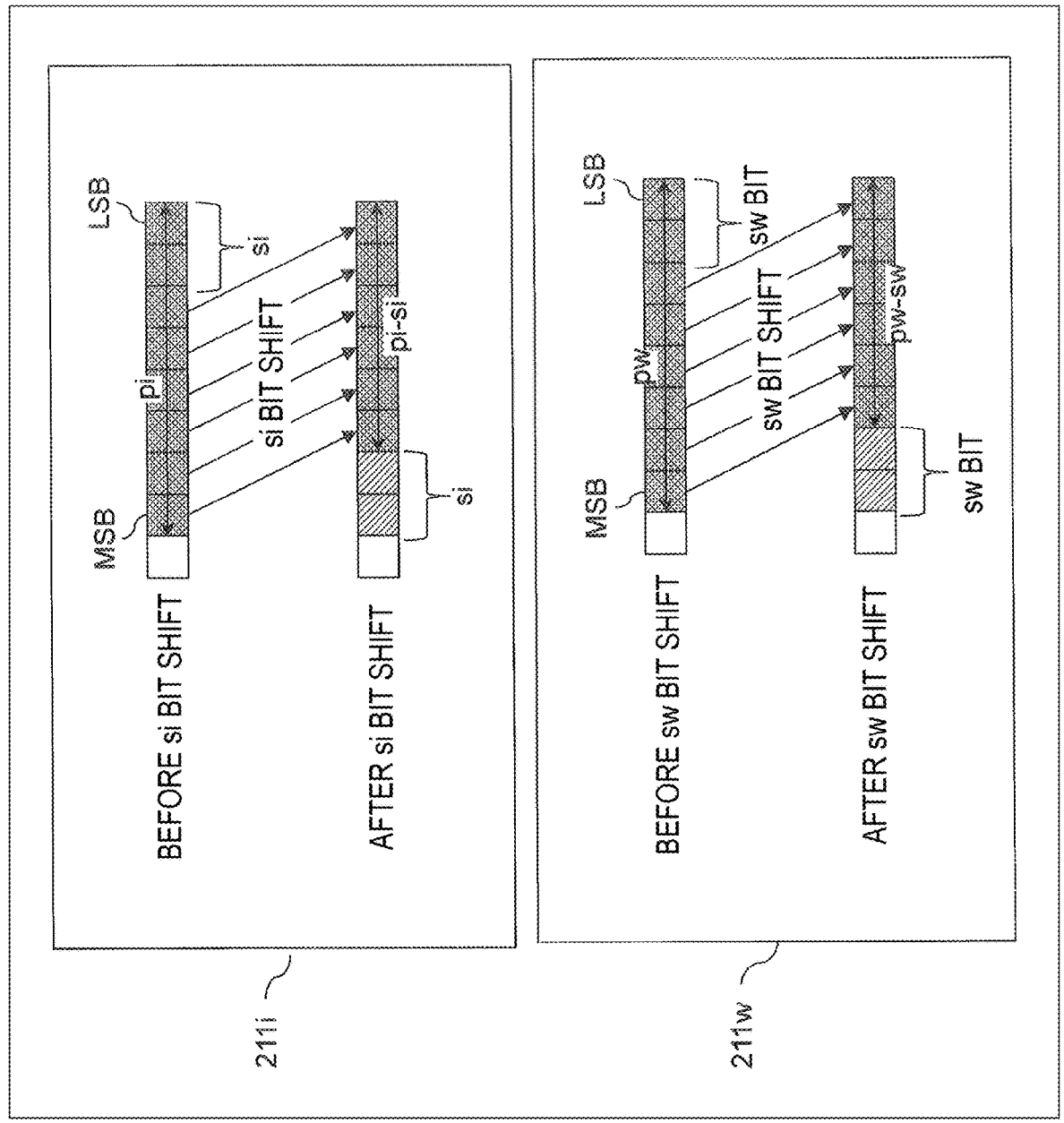
FIG. 4 is an explanatory diagram illustrating an example of bit shift.

FIG. 4 is an explanatory diagram illustrating a bit shift example. The first bit shifter 211$i$ shifts the bit string of the pixel by si bits in a direction from the most significant bit MSB to the least significant bit LSB, thereby reducing the lower si bits of the pixel. The second bit shifter 211$w$ reduces lower sw bits of the weight by shifting the weight bit number pw by sw bits in a direction from the most significant bit MSB to the least significant bit LSB.

As a result, as illustrated in FIG. 2(B), (1) the first bit shifter 211$i$ outputs a pixel having the bit number (pi−si) or the bit number pi to the multiplier 201, and (2) the second bit shifter 211$w$ outputs a weight having the bit number (pw−sw) or the bit number pw to the multiplier 201.

In the first operation of the number of times of addition n×n, the convolution arithmetic unit 103 outputs a (3) multiplication result a×wa (bit number (pi+pw−s)) of (1) the pixel a of the bit number pi−si and (2) the weight wa of the bit number pw−sw. (4) Since it is the first pixel a in the target region 120, there is no addition accumulation result one pixel before. Therefore, (5) the latest addition accumulation result is a multiplication result a×wa of the bit number (pi+pw−s).

In the second operation of the number of times of addition n×n, the convolution arithmetic unit 103 outputs a (3) multiplication result b×wb (bit number (pi+pw−s)) of (1) the pixel b having the bit number pi−si and (2) the weight wb having the bit number pw−sw. (4) The addition accumulation result one pixel before is a multiplication result a×wa of the bit number (pi+pw−s). Therefore, (5) the latest addition accumulation result is a multiplication result (a×wa+b×wb) of the bit number (pi+pw−s+1). As illustrated in (B) of FIG. 3, the convolution arithmetic unit 103 executes such processing up to the pixel i.

In this manner, the convolution arithmetic unit 103 repeats the convolution arithmetic operation up to the number of times of addition n×n. In this case, when the bit number Nmax of (5) the addition accumulation result at the end of the (n×n)_th addition becomes larger than the bit number M of the adder 202, overflow occurs, and the calculation accuracy decreases. However, if the cumulative reduced bit number s (=si+sw) to be shifted in each addition satisfies the condition of the following Expression (2), overflow does not occur.

$$s = N\max - M \quad (2)$$

Nmax is the bit number of (5) the addition accumulation result. By bit-shifting the respective bit strings of the pixel and the weight by the first bit shifter 211$i$ and the second bit shifter 211$w$ so as to satisfy the above Expression (2), overflow can be avoided. Then, the CNN 100 inversely shifts the bit string of (5) the addition accumulation result by the bit inverse shifter 212 by the bit number s for each addition. The inverse shift is to shift the bit string of (5) the addition accumulation result by s bits in the direction from the least significant bit LSB to the most significant bit MSB.

As a result, the s-bit lower bit is added to the bit string of (5) the addition accumulation result. The value of the added s-bit lower bit is arbitrarily set. As described above, by reducing the bit number for the pixel and the weight prior to the convolution arithmetic operation, overflow of the convolution arithmetic unit 103 can be avoided. As a result, a decrease in the calculation accuracy of the convolution arithmetic unit 103 can be suppressed, and the circuit scale of the convolution arithmetic unit 103 can be reduced.

More specifically, even in a case where the overflow occurrence condition (the number of times of addition n×n, input bit width of pixel or weight) is different for each convolution layer Cj, it is not necessary to adjust the bit number M of the adder 202 according to the convolution layer Cj with the strictest overflow condition among all the convolution layers C1 to CL, and the cumulative reduced bit number s to be shifted may be dynamically changed for each layer j.

<Configuration Example of Arithmetic Operation Device>

Figure 5:
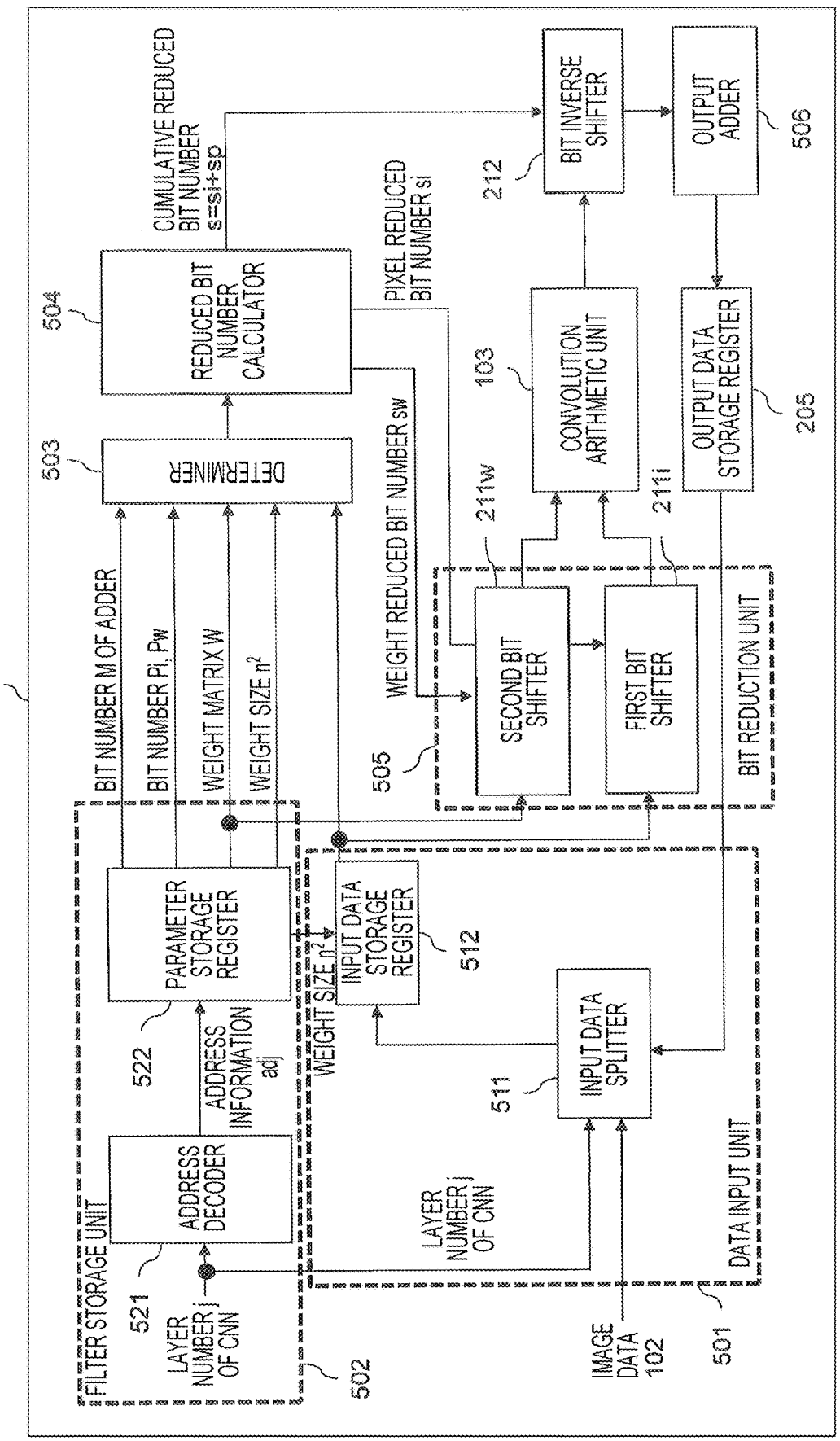
FIG. 5 is a block diagram illustrating a configuration example of an arithmetic operation device according to a first embodiment.

FIG. 5 is a block diagram illustrating a configuration example of the arithmetic operation device according to the first embodiment. An arithmetic operation device 500 includes a data input unit 501, a filter storage unit 502, a determiner 503, a reduced bit number calculator 504, a bit reduction unit 505, a convolution arithmetic unit 103, a bit inverse shifter 212, an output adder 506, and an output data storage register 205. Specifically, the data input unit 501, the filter storage unit 502, the determiner 503, the reduced bit number calculator 504, the bit reduction unit 505, the convolution arithmetic unit 103, the bit inverse shifter 212, the output adder 506, and the output data storage register 205 are realized by, for example, a large-scale integrated circuit (LSI) or a memory.

The data input unit 501 receives an input of data. The data input to the data input unit 501 is referred to as "input data". For example, the data input unit 501 receives an input of the image data 102 output from a camera (not illustrated) connected to the arithmetic operation device 500. In this case, the image data 102 is input data. The data input unit 501 also receives an input of the latest addition accumulation result (see (5) of FIG. 2(B)) stored in the output data storage register 205. The latest addition accumulation result is also input data.

The data input unit 501 includes an input data splitter 511 and an input data storage register 512. The input data splitter 511 switches the input data to be output to the input data storage register 512 to either the image data 102 or the latest addition accumulation result on the basis of the layer number j of the CNN 100. Specifically, for example, when the layer number j of the convolution layer Cj is j=1, the input data splitter 511 outputs the image data 102 to the input data storage register 512, and when the layer number j is j 2, the input data splitter 511 outputs the latest addition accumulation result to the input data storage register 512. Note that the layer number j is incremented when the convolution arithmetic operation of the input data is completed.

The input data storage register 512 stores the input data from the input data splitter 511. The input data storage register 512 selects the target region 120 to be convolved with the weight filter 110 according to the weight size n×n corresponding to the current layer number j from a parameter storage register 522, and outputs the selected target region to the determiner 503 and the first bit shifter 211$i$.

The filter storage unit 502 stores the weight filter 110 for each convolution layer Cj. Specifically, for example, the filter storage unit 502 includes an address decoder 521 and a parameter storage register 522. The address decoder 521 outputs address information adj corresponding to the layer number j of the convolution layer Cj to the parameter storage register 522. The parameter storage register 522 stores the bit number M of the adder 202 in the convolution arithmetic unit 103. In addition, the parameter storage register 522 stores the pixel bit number pi, the weight bit number pw, the weight matrix W, and the weight size n×n for each piece of the address information adj.

The determiner 503 calculates the bit number Nmax of the adder 202 necessary for preventing an overflow from occurring in the convolution arithmetic unit 103 in the convolution arithmetic operation of the target region 120. The bit number Nmax is calculated by, for example, the following Expression (3).

$$N\max=(pi+pw)+\log_2(n^2) \quad (3)$$

Then, the determiner 503 determines in advance whether an overflow occurs in the convolution arithmetic unit 103 by the following Expression (4) based on the bit number Nmax calculated by the above Expression (3) and the bit number M of the adder 202.

$$M<N\max \quad (4)$$

In a case where M<Nmax is satisfied, the determiner 503 determines that the overflow occurs in the convolution arithmetic unit 103 in the convolution arithmetic operation of the target region 120, and in a case where M<Nmax is not satisfied, the determiner determines that the overflow does not occur in the convolution arithmetic unit 103 in the convolution arithmetic operation of the target region 120.

The reduced bit number calculator 504 calculates the cumulative reduced bit number s and outputs the same to the bit inverse shifter 212. The cumulative reduced bit number s is a total value of the pixel reduced bit number si and the weight reduced bit number sw (s=si+sw). The pixel reduced bit number si is the bit number for shifting the bit string of the pixel having the bit number pi in the direction from the most significant bit MSB to the least significant bit LSB. The bit string of the pixel reduced bit number si overflowing from the least significant bit LSB is reduced from the bit string of the pixel of the bit number pi.

The weight reduced bit number sw is the bit number for shifting the weight of the bit number pw from the most significant bit MSB to the least significant bit LSB. The bit string corresponding to the weight reduced bit number sw overflowing from the least significant bit LSB is reduced from the bit string of the weight of the bit number pw. A ratio of the pixel reduced bit number si and the weight reduced bit number sw to the cumulative reduced bit number s is arbitrarily set. Any one of the pixel reduced bit number si and the weight reduced bit number sw may be 0.

Specifically, for example, the reduced bit number calculator 504 sets the cumulative reduced bit number s to 0 bits when the determiner 503 determines that M<Nmax is not satisfied. On the other hand, when the determiner 503 determines that M<Nmax is satisfied, the reduced bit number calculator 504 calculates the cumulative reduced bit number s by the following Expression (5).

$$s=\log_2(|n^2-2^{(M-(pi+pw))}|) \quad (5)$$

"$2^{(M-(pi+pw))}$" on the right side indicates how many times the multiplication result of the pixel and the weight (bit number pi+pw) can be cumulatively added by the M-bit adder 202. That is, "M−(pi+pw)" indicates a bit margin until overflow (see (1) and (2) in (B) of FIG. 2) when the multiplication result (bit number pi+pw) is cumulatively added by the M-bit adder 202. If the calculation result of the cumulative reduced bit number s in the above Expression (5) is an integer, the result is adopted as it is. When the calculation result of the cumulatively reduced bit number s of the above Expression (5) includes a decimal fraction, a value after rounding up is adopted as the cumulatively reduced bit number s. For example, when the calculation result of the above Expression (5) is "5.4", "6" which is a value after rounding up is adopted as the cumulative reduced bit number s.

In addition, the reduced bit number calculator 504 outputs the pixel reduced bit number si to the first bit shifter 211i and outputs the weight reduced bit number sw to the second bit shifter 211w.

The bit reduction unit 505 includes a first bit shifter 211i and a second bit shifter 211w. The first bit shifter 211i sequentially receives pixels in the target region 120 and shifts the pixels in a direction from the most significant bit MSB to the least significant bit LSB by the pixel reduced bit number si.

The first bit shifter 211i outputs pixels of the bit number (pi−si) after the bit shift to the convolution arithmetic unit 103. The second bit shifter 211w sequentially receives weights wa to wi which are elements of the weight matrix W, and shifts the weights from the most significant bit MSB to the least significant bit LSB by the weight reduced bit number sw. The second bit shifter 211w outputs the weight of the bit number (pw−sw) after the bit shift to the convolution arithmetic unit 103.

As illustrated in (B) of FIG. 2, the convolution arithmetic unit 103 sequentially receives the pixel from the first bit shifter 211i and the weight from the second bit shifter 211w and executes the convolution arithmetic operation. The convolution arithmetic unit 103 outputs a convolution arithmetic operation result of the target region 120 to the adder 202 and the bit inverse shifter 212.

The bit inverse shifter 212 inversely shifts the addition accumulation result of the target region 120 from the convolution arithmetic unit 103 in the direction from the least significant bit LSB to the most significant bit MSB by the cumulative reduced bit number s. A predetermined value (for example, 0) is padded to a blank bit string corresponding to the cumulative reduced bit number s from the least significant bit LSB after the bit inverse shift. As described above, the bit inverse shifter 212 functions as a bit addition unit that adds a bit string corresponding to the cumulative reduced bit number s.

The output adder 506 adds the addition accumulation result of the target region 120 after the bit inverse shift to the latest addition accumulation result stored in the output data storage register 205. The output data storage register 205 stores the latest addition accumulation result. The latest addition accumulation result is updated by adding the addition accumulation result of the target region 120 by the output adder 506. The output data storage register 205 is reset when the layer number j is updated.

<Example of Arithmetic Processing Procedure of Arithmetic Operation Device 500>

Figure 6:
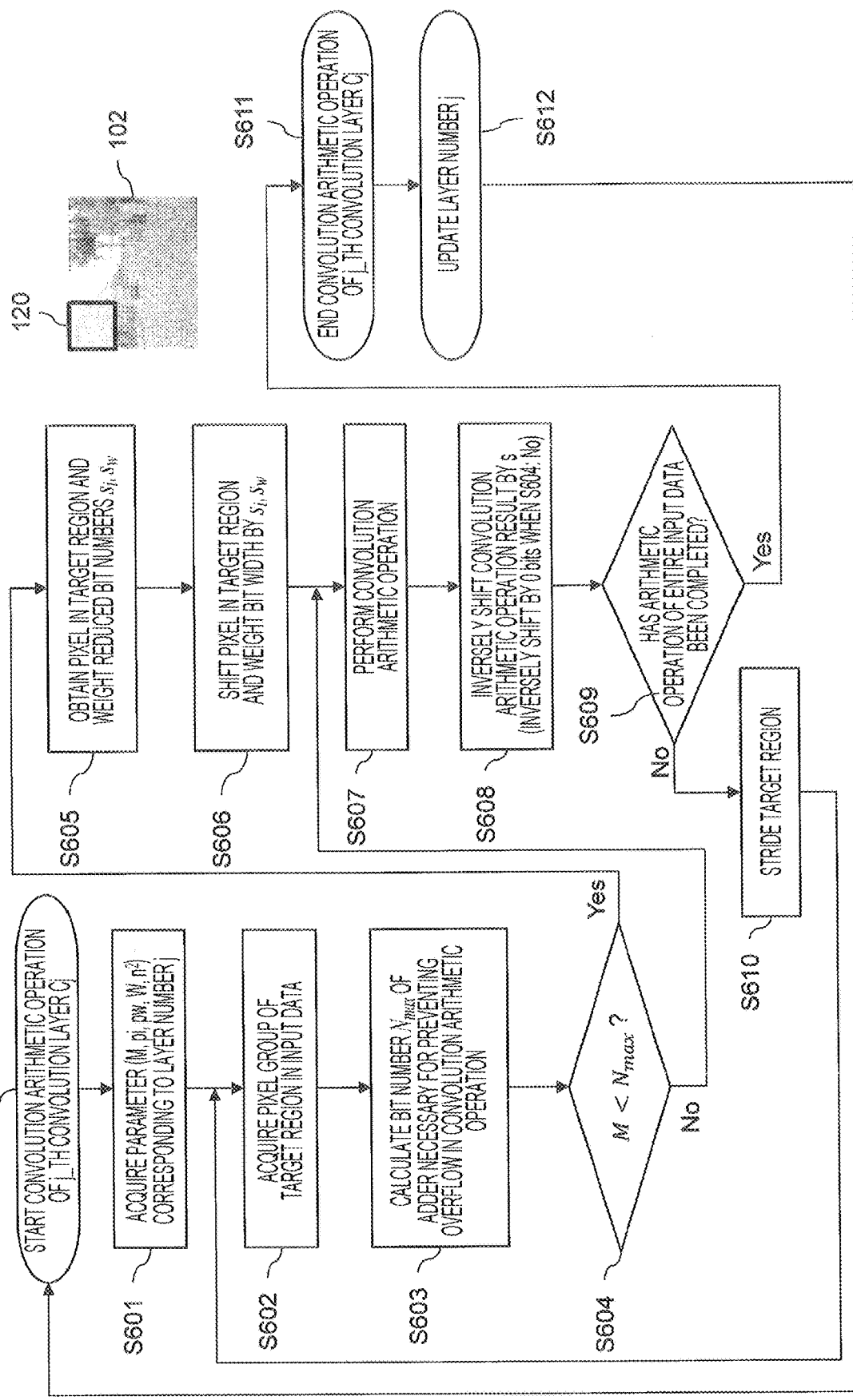
FIG. 6 is a flowchart illustrating an example of an arithmetic processing procedure of the arithmetic operation device according to the first embodiment.

FIG. 6 is a flowchart illustrating an example of an arithmetic processing procedure of the arithmetic operation device 500 according to the first embodiment. The arithmetic operation device 500 starts a convolution arithmetic operation of the j_th convolution layer Cj (Step S600). Note that an initial value of the layer number j is j=1. The arithmetic operation device 500 acquires the bit number M of the adder 202, the pixel bit number pi, the weight bit number pw, the weight matrix W, and the weight size $n^2$ as the parameters corresponding to the layer number j from the filter storage unit 502 (Step S601).

The arithmetic operation device 500 acquires a pixel group of the target region 120 in the input data by the data input unit 501 (Step S602). The input data when the layer number j=1 is the image data 102, and the input data when j≥2 is the convolution arithmetic operation result 104 in the (j−1)_th convolution layer Cj stored in the output data storage register 205. The initial position of the target region 120 is the upper left corner of the input data. The target region 120 moves rightward with a predetermined stride each time the product-sum operation in the target region 120 is completed, and when reaching the right end, moves downward with a predetermined stride and moves in the right direction again.

In the arithmetic operation device 500, the determiner 503 calculates the bit number Nmax of the adder 202 necessary for preventing the overflow from occurring in the convolution arithmetic operation using the above Expression (3) (Step S603). Then, in the arithmetic operation device 500, the determiner 503 determines whether the bit number M of the adder 202 is smaller than the bit number Nmax calculated in Step S603 by using the above Expression (4) (Step S604).

In a case where the bit number M of the adder 202 is smaller than the bit number Nmax (Step S604: Yes), the process proceeds to Step S605. In a case where the bit number M of the adder 202 is not smaller than the bit number Nmax (Step S604: No), the process proceeds to Step S607.

In Step S605, the arithmetic operation device 500 obtains the pixel reduced bit number si and the weight reduced bit number sw in the target region 120 by the reduced bit number calculator 504 using the above Expression (5) (Step S605). Then, the arithmetic operation device 500 shifts the pixel bit number pi in the target region 120 by the pixel reduced bit number si and shifts the weight bit number pw by the weight reduced bit number sw by the bit reduction unit 505 (Step S606). As a result, lower bits corresponding to the bit number si of the pixel are reduced from the bit string of the pixel, and lower bits corresponding to the bit number sw of the weight are reduced from the bit string of the weight.

In Step S607, the arithmetic operation device 500 performs a convolution arithmetic operation by the convolution arithmetic unit 103 (Step S607). The arithmetic operation device 500 inversely shifts the convolution arithmetic operation result of the target region 120 in Step S607 by the cumulative reduced bit number s by the bit inverse shifter 212 (Step S608). Note that, in the case of Step S604: No, since the cumulative reduced bit number s is set to 0, the inverse shift by 0 bits, that is, the inverse shift is not performed.

The arithmetic operation device 500 determines whether the calculation of the entire input data is completed (Step S609). When the processing has not been completed (Step S609: No), the arithmetic operation device 500 strides the target region 120 and returns to Step S602. When the operation of the entire input data is completed (Step S609: Yes), the arithmetic operation device 500 ends the operation of the j_th convolution layer Cj (Step S611). Then, the arithmetic operation device 500 increments the layer number j and returns to Step S600. When the layer number j is j=L, the arithmetic operation device 500 ends the arithmetic processing.

As described above, the arithmetic operation device 500 according to the first embodiment performs the overflow determination for each convolution layer Cj, and when it is determined in advance that the overflow occurs, the pixel bit number pi and the weight bit number pw are reduced to dynamically secure the margin of the number of times of addition in the adder 202. As a result, the circuit scale of the convolution arithmetic operation can be reduced.

In addition, by monitoring the output from the bit reduction unit 505, it is possible to confirm whether the pixels and the weights input to the convolution arithmetic unit 103 are bit-shifted. In addition, by monitoring whether the value of the lower bit corresponding to the reduced bit number s of the latest addition accumulation result stored in the output data storage register 205 matches the padded value, it is possible to confirm whether bit inverse shift has been performed.

Second Embodiment

Next, a second embodiment will be described. The arithmetic operation device 500 of the first embodiment determines the cumulative reduced bit number s on the basis of the number of times of addition n×n (see the above Expression (5)). The arithmetic operation device 500 of the second embodiment determines the cumulative reduced bit number s according to the content of the input data. Specifically, for example, when the value of the most significant bit MSB of the bit string of the pixel or the weight is 0, the bits necessary for moving up are considered to be reduced in the addition of the bit string. The most significant bit MSB of the bit string of the pixel or the weight is referred to as a determination bit. Note that the same reference numerals are given to the same parts as those of the first embodiment, and the description thereof will be omitted.

Figure 7:
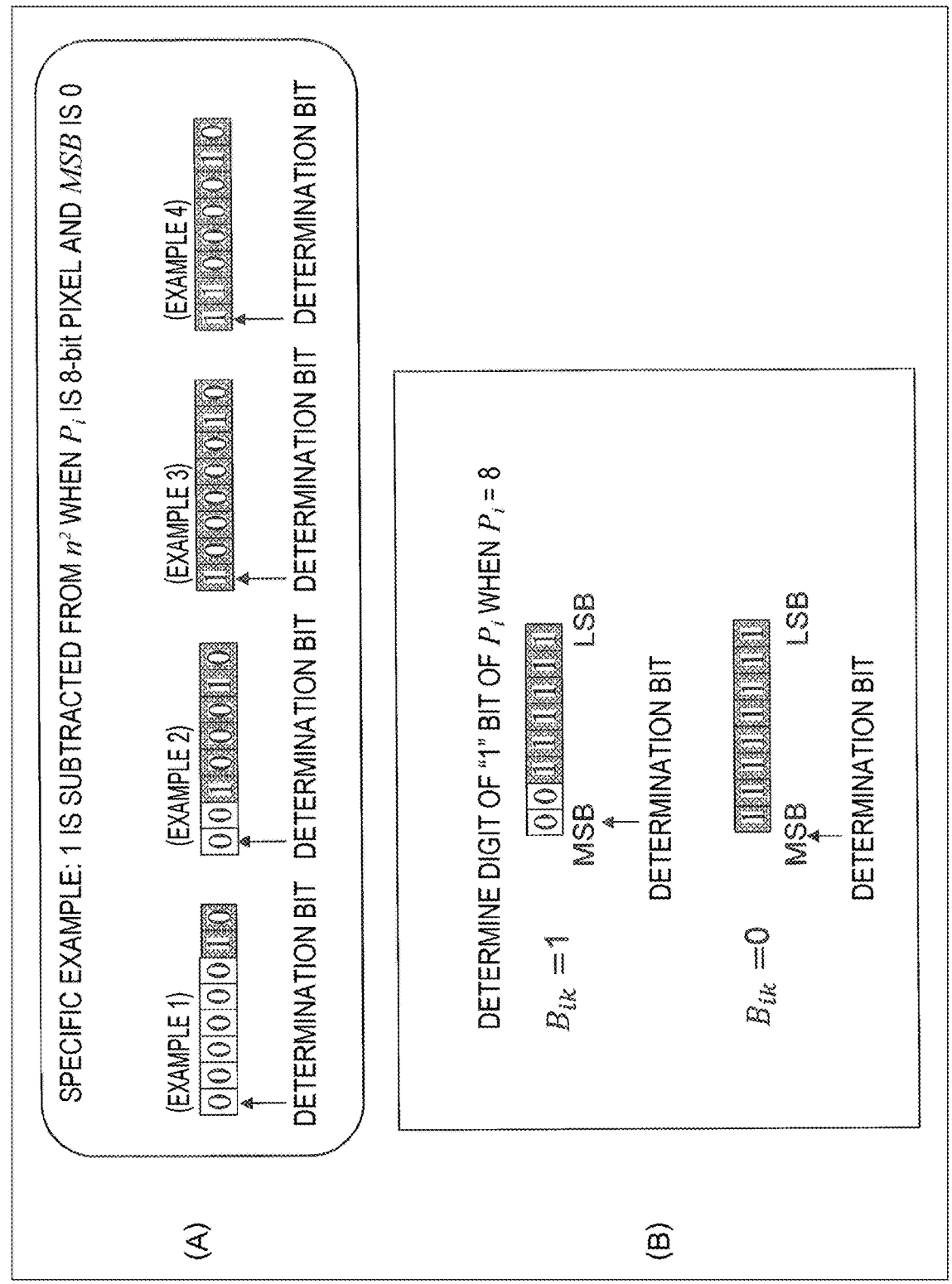
FIG. 7 is an explanatory diagram illustrating an example of the bit shift according to a second embodiment.

FIG. 7 is an explanatory diagram illustrating an example of bit shift according to the second embodiment. FIG. 7 illustrates an example of a bit string of pixels in which the pixel bit number pi is pi=8 bits. In (A), the determination bits (MSB) of the bit strings (Example 1) and (Example 2) are both "0". Therefore, 1 is subtracted from the number of times of addition n×n. The determination bits (MSB) of the bit strings of (Example 3) and (Example 4) are both "1". Therefore, it is not subtracted from the number of times of addition n×n.

When the determiner 503 determines that M<Nmax, the reduced bit number calculator 504 according to the second embodiment calculates the cumulative reduced bit number s by the following Expression (6).

[Math. 1]

$$s = \log_2\left(\left(n^2 - \sum_{k=1}^{n^2} X_k\right) - 2^{M-(P_i+P_w)}\right) \quad (6)$$

Here, $k = 1, 2, 3, \ldots n^2$ $X_k$: In product-sum operation $$B_{i_k} = \begin{cases} 0: & \text{MSB of bit string of pixel is 1} \\ 1: & \text{MSB of bit string of pixel is 0} \end{cases}$$

$$B_{w_k} = \begin{cases} 0: & \text{MSB of bit string of weight is 1} \\ 1: & \text{MSB of bit string of weight is 0} \end{cases}$$

$X_k = B_{i_k} \cup B_{w_k}$

Bik is "0" when the value of the most significant bit MSB of the bit string of the pixel is "1", and is "1" when the value is "0". Similarly, Bwk is "0" when the value of the most significant bit MSB of the bit string of the weight is "1", and is "1" when the value is "0". Xk is a logical sum of Bik and Bwk. That is, when the value of the most significant bit MSB of at least one of the bit string of the pixel and the bit string of the weight is "0", Xk is "1".

The sum of Xk indicates a bit margin (the number of empty bits from the most significant bit MSB) until overflow when the output from the multiplier 201 is input to the M-bit adder 202. (B) of FIG. 7 illustrates an example of the determination of Bik. When the determination bit is "0", Bik=1 is set, and when the determination bit is "1", Bik=0 is set. Although not illustrated, the same applies to Bwk.

As described above, similarly to the first embodiment, the arithmetic operation device 500 according to the second embodiment performs the overflow determination for each convolution layer Cj, and when it is determined in advance that the overflow occurs, the pixel bit number pi and the weight bit number pw are reduced to dynamically secure the margin of the number of times of addition in the adder 202. As a result, the circuit scale of the convolution arithmetic operation can be reduced.

In addition, since the cumulative reduced bit number s can be made smaller than that in the first embodiment, the reduction width of the bit string is smaller than that in the first embodiment. Therefore, the calculation accuracy of the convolution arithmetic unit 103 can be improved as compared with the first embodiment.

Third Embodiment

Next, a third embodiment will be described. The arithmetic operation device 500 of the first embodiment determines the cumulative reduced bit number s on the basis of the number of times of addition n×n (see the above Expression (5)). Similarly to the second embodiment, the arithmetic operation device 500 of the third embodiment determines the cumulative reduced bit number s according to the content of the input data. Specifically, for example, the determiner 503 searches in the direction from the most significant bit MSB to the least significant bit LSB in the bit string of the pixel or the weight, and specifies the position of the digit in which the value of 1 first appears. Note that the same reference numerals are given to the same parts as those of the first embodiment, and the description thereof will be omitted.

Figure 8:
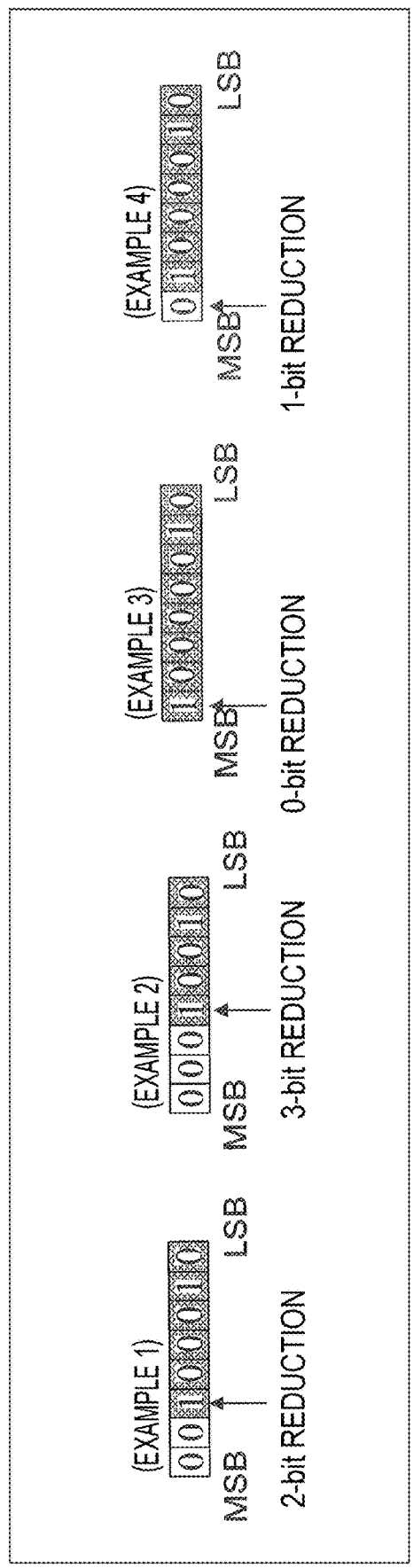
FIG. 8 is an explanatory diagram illustrating a search example of a bit string.

FIG. 8 is an explanatory diagram illustrating a search example of a bit string. In the case of the bit string of (Example 1), two bits from the most significant bit MSB are "00", and "1" appears in the third bit. Therefore, two bits from the most significant bit MSB are reduced. In the case of the bit string of (Example 2), three bits from the most significant bit MSB are "000", and "1" appears in the fourth bit. Therefore, three bits are reduced from the most significant bit MSB. In the case of the bit string of (Example 3), "1" appears in the most significant bit MSB. Therefore, 0 bits are reduced from the most significant bit MSB. In the case of the bit string of (Example 4), one bit from the most significant bit MSB is "0", and "1" appears in the second bit. Therefore, one bit is reduced from the most significant bit MSB.

When the determiner 503 determines that M<Nmax, the reduced bit number calculator 504 according to the third embodiment calculates the cumulative reduced bit number s by the following Expression (7).

[Math. 2]

$$s = \log_2(n^2 - 2^{M-(P_i+P_w)}) - \frac{1}{n^2} \cdot \sum_{k=1}^{n^2}(W_k + I_k) \quad (7)$$

Here, $k = 1, 2, 3, \ldots n^2$

Wk is a value indicating how many bits smaller the position where the bit value is "1" from the maximum bit of the multiplier 201 among the weights used in the k_th addition, in other words, how many bits the value is considered to be reduced in advance. In the example of FIG. 8, in a case where the bit string of the pixel is (Example 1), Wk=2.

Ik is a value indicating how many bits smaller the position where the bit value is "1" from the maximum bit of the multiplier 201 among the pixels used in the k_th addition, in other words, how many bits the value is considered to be reduced in advance. In the example of FIG. 8, in a case where the bit string of the weight is (Example 2), Wk=3.

As described above, similarly to the first embodiment, the arithmetic operation device 500 according to the third embodiment performs the overflow determination for each convolution layer Cj, and when it is determined in advance that the overflow occurs, the pixel bit number pi and the weight bit number pw are reduced to dynamically secure the margin of the number of times of addition in the adder 202. As a result, the circuit scale of the convolution arithmetic operation can be reduced.

Further, by reducing the high-order bits having no influence on the value from the bit string, the cumulative reduced bit number s can be made smaller than that in the first embodiment, and the arithmetic accuracy of the convolution arithmetic unit 103 can be improved as compared with the second embodiment.

Fourth Embodiment

Next, a fourth embodiment will be described. In the first embodiment, whether the adder 202 overflows is determined in advance in the arithmetic operation device 500 before the convolution arithmetic operation, and the cumulative reduced bit number s is calculated so that the overflow does not occur, and the bit number of the bit string of the pixel or the weight is reduced. In the fourth embodiment, a computer outside the arithmetic operation device 500 executes overflow determination by the determiner 503 and calculation of the cumulative reduced bit number s by the reduced bit number calculator 504 in advance as in the arithmetic operation device 500 of the first embodiment, and creates an overflow determination result table. The overflow determination result table is implemented in the arithmetic operation device 500 of the fourth embodiment. Note that the same reference numerals are given to the same parts as those of the first embodiment, and the description thereof will be omitted.

<Configuration Example of Arithmetic Operation Device 500>

Figure 9:
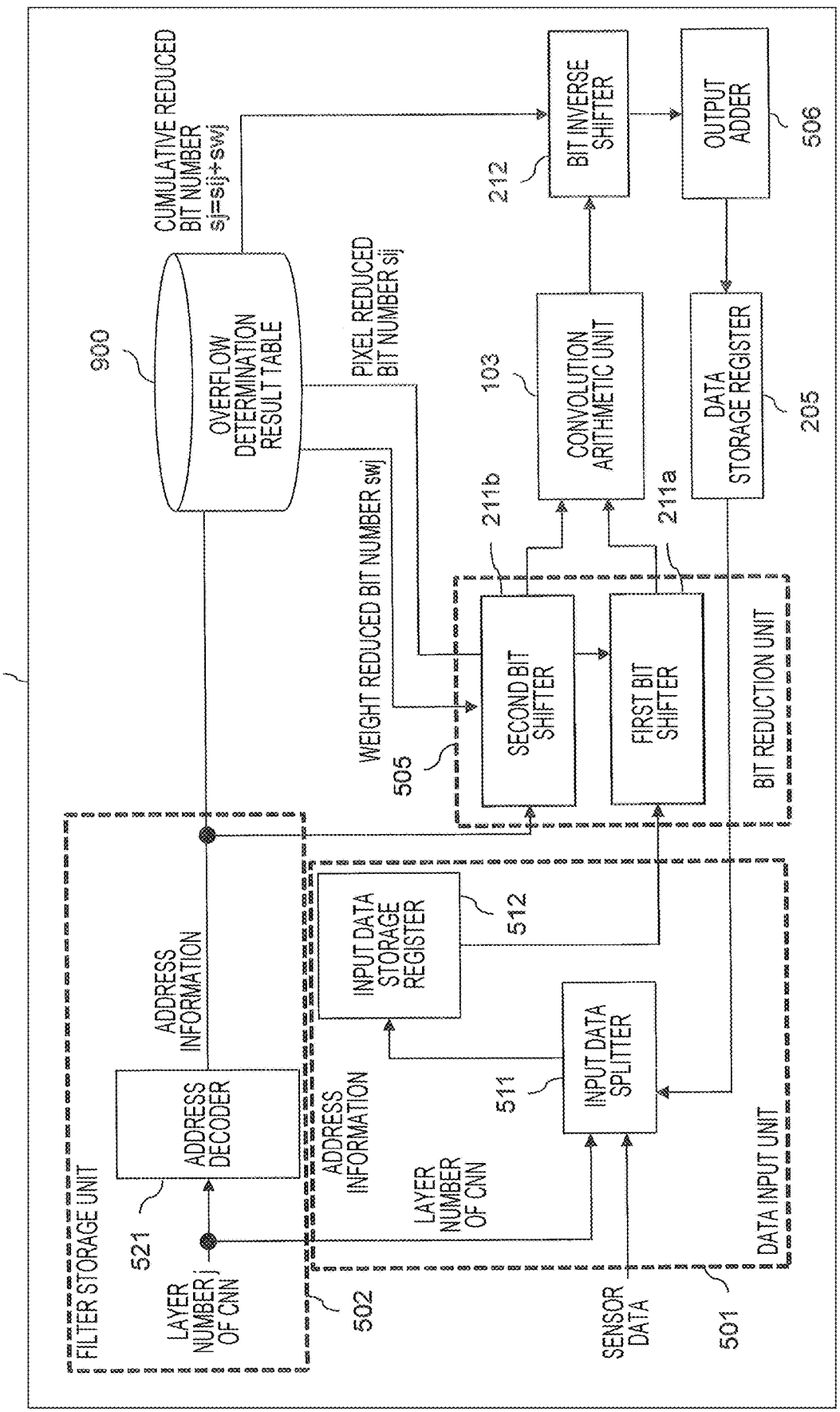
FIG. 9 is a block diagram illustrating a configuration example of the arithmetic operation device according to a fourth embodiment.

FIG. 9 is a block diagram illustrating a configuration example of the arithmetic operation device 500 according to the fourth embodiment. The arithmetic operation device 500 of the fourth embodiment includes an overflow determination result table 900 instead of the determiner 503 and the reduced bit number calculator 504 of the first embodiment.

Figure 10:
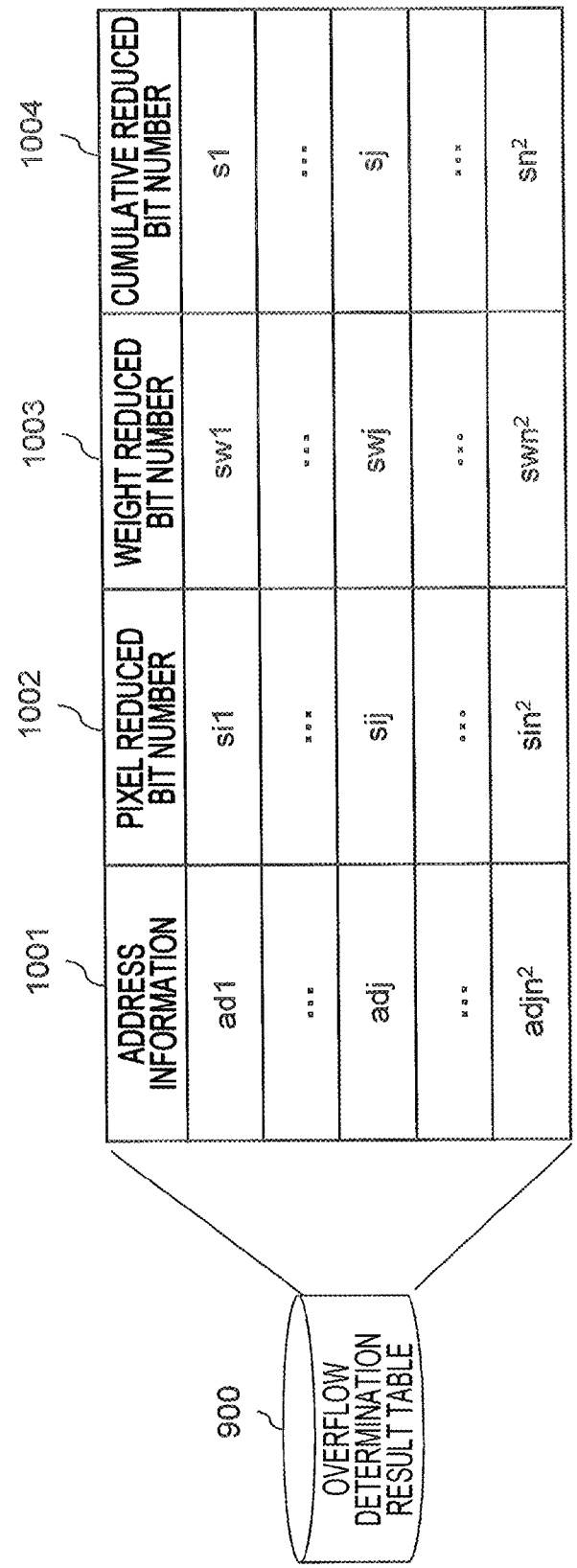
FIG. 10 is an explanatory diagram illustrating an example of an overflow determination result table.

FIG. 10 is an explanatory diagram illustrating an example of the overflow determination result table 900. The overflow determination result table 900 includes an address information field 1001, a pixel reduced bit number field 1002, a weight reduced bit number field 1003, and a cumulative reduced bit number field 1004. A value of each field in the same row constitutes an entry indicating an overflow determination result in the j_th convolution layer Cj. Note that j at the end of the sign of the value of the field means the layer number j. For example, the pixel reduced bit number sij means the pixel reduced bit number si of the j_th convolution layer Cj.

The address information field 1001 is a field for storing the address information adj. The address information adj is information corresponding to the layer number j. The pixel reduced bit number field 1002 is a field for storing the pixel reduced bit number sij. The weight reduced bit number field 1003 is a field for storing the weight reduced bit number swj. The cumulative reduced bit number field 1004 is a field that stores the cumulative reduced bit number sj (=sij+swj).

When performing the convolution arithmetic operation on the j_th convolution layer Cj, the arithmetic operation device 500 reads the address information adj from the address decoder 521 and outputs the address information adj to the overflow determination result table 900. The arithmetic operation device 500 specifies the pixel reduced bit number sij, the weight reduced bit number swj, and the cumulative reduced bit number sj included in the entry of the address information adj in the overflow determination result table 900.

Then, the arithmetic operation device 500 outputs the pixel reduced bit number sij from the overflow determination result table 900 to the first bit shifter 211a, outputs the weight reduced bit number swj from the overflow determination result table 900 to the second bit shifter 211b, and outputs the cumulative reduced bit number sj from the overflow determination result table 900 to the bit inverse shifter 212. Note that, in the convolution layer Cj in which overflow occurs in the adder 202 if bit shift is not performed, the cumulative reduced bit number sj satisfies sj>0, and in the convolution layer Cj in which overflow does not occur in the adder 202 even if bit shift is not performed, the cumulative reduced bit number sj satisfies sj=0.

Note that the overflow determination result table 900 may not store the column of the cumulative reduced bit number field 1004. In this case, the bit inverse shifter 212 calculates the cumulative reduced bit number sj (=sij+swj).

<Example of Arithmetic Processing Procedure of Arithmetic Operation Device 500>

FIG. 11 is a flowchart illustrating an example of an arithmetic processing procedure of the arithmetic operation device 500 according to the fourth embodiment. The difference from FIG. 6 is that, in FIG. 11, the arithmetic operation device 500 does not execute Step S605.

Note that the value of the overflow determination result table 900 may be updated. Specifically, for example, it is assumed that the arithmetic operation device 500 is communicably connected to a management server (not illustrated). Using the image data 102 as training data, the management server calculates the pixel reduced bit number sij, the weight reduced bit number swj, and the cumulative reduced bit number sj for each convolution layer Cj as in the arithmetic operation devices 500 of the first to third embodiments. Then, the management server transmits the pixel reduced bit number sij, the weight reduced bit number swj, and the cumulative reduced bit number sj to the arithmetic operation device 500 for each convolution layer Cj.

In this way, the arithmetic operation device 500 can update the overflow determination result table 900 with the pixel reduced bit number sij, the weight reduced bit number swj, and the cumulative reduced bit number sj for each convolution layer Cj from the management server.

For example, it is assumed that the arithmetic operation device 500 is mounted on each ECU of a plurality of automobiles. The management server receives image data captured by a vehicle in a specific time zone, for example, from the vehicle having a relatively or absolute high nighttime travel frequency in a plurality of vehicles, and recalculates the pixel reduced bit number sij, the weight reduced bit number swj, and the cumulative reduced bit number sj for each convolution layer Cj using the received image data as training data.

Then, the management server transmits the pixel reduced bit number sij, the weight reduced bit number swj, and the cumulative reduced bit number sj recalculated for each convolution layer Cj to the arithmetic operation device 500 of the automobile having a high traveling frequency at night. As a result, the content of the overflow determination result table 900 can be updated to a value specialized for the user of the arithmetic operation device 500, and the arithmetic accuracy can be improved. In the example described above, the traveling frequency at night has been described, but the traveling frequency may be the traveling frequency in bad weather such as rainfall or snowfall.

As described above, the arithmetic operation device 500 according to the fourth embodiment reduces the pixel bit number pij and the weight bit number pwj, and dynamically secures the margin of the number of times of addition in the adder 202. As a result, the circuit scale of the convolution arithmetic operation can be reduced. In addition, since the determiner 503 and the reduced bit number calculator 504 are not mounted on the arithmetic operation device 500, the circuit scale can be reduced. In addition, since the determiner 503 and the reduced bit number calculator 504 are not implemented in the arithmetic operation device 500, the processing is not executed by the determiner 503 and the reduced bit number calculator 504. Therefore, low power consumption can be achieved.

As described above, in the above-described embodiment, it is possible to suppress overflow of the DNN and an increase in circuit mounting scale associated therewith.

Further, the invention is not limited to the above-described embodiments. Various modifications and equivalent configurations may be contained within the scope of claims. For example, the above-described embodiments are given in detail in order to help easy understating of the invention. The invention is not limited to be provided all the configurations described above. In addition, some of the configurations of a certain embodiment may be replaced with the configuration of the other embodiment. In addition, the configurations of the other embodiment may be added to the configurations of a certain embodiment. In addition, some of the configurations of each embodiment may be added, omitted, or replaced with respect to the configuration of the other embodiment.

In addition, the above-described configurations, functions, processing units, and processing means may be realized by a hardware configuration by setting some or all of the configurations using an integrated circuit, or may be realized by a software configuration by analyzing and performing a program to realize the functions by the processor.

The information of the program realizing functions, tables, and files may be stored in a memory device such as a memory, a hard disk, a Solid State Drive (SSD) or a recording medium such as an Integrated Circuit (IC) card, an SD card, and a Digital Versatile Disc (DVD).

In addition, only control lines and information lines considered to be necessary for explanation are illustrated, but not all the control lines and the information lines necessary for mounting are illustrated. In practice, almost all the configurations may be considered to be connected to each other.

The invention claimed is:

1. An arithmetic operation device that causes a convolution arithmetic unit to perform a convolution arithmetic operation between a filter and target data corresponding to a size of the filter in each of a plurality of convolution layers constituting a neural network, the arithmetic operation device comprising:
   a bit reduction unit that reduces a bit string corresponding to a first bit number from a least significant bit of the target data and reduces a bit string corresponding to a second bit number from a least significant bit of a weight that is an element of the filter for each convolution layer; and
   a bit addition unit that adds a bit string corresponding to a third bit number obtained by adding the first bit number and the second bit number to a least significant bit of a convolution arithmetic operation result output from the convolution arithmetic unit by inputting the target data and the weight after being reduced by the bit reduction unit to the convolution arithmetic unit.

2. The arithmetic operation device according to claim 1, comprising
   a determiner that determines whether an overflow occurs in the convolution arithmetic unit for each of the convolution layers,
   wherein the bit reduction unit reduces a bit string corresponding to the first bit number from the least significant bit of the target data and reduces a bit string corresponding to the second bit number from the least significant bit of the weight on the basis of a determination result by the determiner, and
   the bit addition unit adds a bit string corresponding to the third bit number to the least significant bit of the convolution arithmetic operation result on the basis of a determination result by the determiner.

3. The arithmetic operation device according to claim 2, comprising
   a storage unit that stores, for each of the convolution layers, a size of the filter, a bit number of the target data, and a bit number of a weight that is an element in the filter,
   wherein the determiner acquires the size of the filter, the bit number of the target data, and the bit number of the weight that is an element in the filter in the convolution layer to be subjected to the convolution arithmetic operation from the storage unit, calculates a fourth bit number in which no overflow occurs in the convolution arithmetic unit, and determines whether an overflow occurs in the convolution arithmetic unit on the basis of the fourth bit number and a bit number of an adder in the convolution arithmetic unit.

4. The arithmetic operation device according to claim 1, comprising
   a reduced bit number calculator that calculates the third bit number on the basis of a size of the filter, a bit number of the target data, a bit number of the weight that is an element in the filter, and a bit number of an adder in the convolution arithmetic unit in a convolution layer to be subjected to a convolution arithmetic operation, and determines the first bit number and the second bit number on the basis of the third bit number,
   wherein the bit reduction unit reduces a bit string corresponding to the first bit number determined by the reduced bit number calculator from the least significant bit of the target data, and reduces a bit string corresponding to the second bit number determined by the reduced bit number calculator from the least significant bit of the weight, and
   the bit addition unit adds a bit string corresponding to the third bit number calculated by the reduced bit number calculator to the least significant bit of the convolution arithmetic operation result.

5. The arithmetic operation device according to claim 4, wherein the reduced bit number calculator further calculates the third bit number on the basis of at least one of a value of the target data and a value of the weight.

6. The arithmetic operation device according to claim 5, wherein the reduced bit number calculator calculates the third bit number on the basis of the number of times of convolution arithmetic operation in which at least one of a value of a most significant bit of the target data and a value of a most significant bit of the weight becomes 0.

7. The arithmetic operation device according to claim 5, wherein the reduced bit number calculator calculates the third bit number on the basis of a bit number in which a value of 0 continues from a most significant bit of the target data and a bit number in which a value of 0 continues from a most significant bit of the weight.

8. The arithmetic operation device according to claim 1, comprising
   a storage unit that stores the first bit number and the second bit number for each of the convolution layers,
   wherein the bit reduction unit acquires the first bit number and the second bit number for each convolution layer, reduces a bit string corresponding to the first bit number from the least significant bit of the target data, and reduces a bit string corresponding to the second bit number from the least significant bit of the weight.

9. The arithmetic operation device according to claim 8, wherein
   the storage unit further stores the third bit number for each of the convolution layers, and
   the bit addition unit acquires the third bit number from the storage unit for each of the convolution layers, and adds a bit string corresponding to the third bit number to the least significant bit of the convolution arithmetic operation result.

10. An arithmetic operation method by an arithmetic operation device that causes a convolution arithmetic unit to perform a convolution arithmetic operation between a filter and target data corresponding to a size of the filter in each of a plurality of convolution layers constituting a neural network, wherein the arithmetic operation device is configured to:
    reduce a bit string corresponding to a first bit number from a least significant bit of the target data and reduces a bit string corresponding to a second bit number from a least significant bit of a weight for each convolution layer; and
    add a bit string corresponding to a third bit number obtained by adding the first bit number and the second bit number to a least significant bit of a convolution arithmetic operation result output from the convolution arithmetic unit by inputting the target data and the weight that is an element of the filter after being reduced by the bit reduction unit to the convolution arithmetic unit.

\* \* \* \* \*